US008374605B2

(12) United States Patent
Kuhn et al.

(10) Patent No.: US 8,374,605 B2
(45) Date of Patent: Feb. 12, 2013

(54) METHOD FOR SELECTING AN S-CSCF UNIT WITHIN AN IMS-BASED SERVICE COMMUNICATION SYSTEM

(75) Inventors: Gerhard Kuhn, München (DE); Christoph Pollak, Vienna (AT); Erwin Postmann, Forchtenstein (AT); Robert Seidl, Königsdorf (DE)

(73) Assignee: Seimens Aktiengesellschaft, Munich (DE)

( * ) Notice: Subject to any disclaimer, the term of this patent is extended or adjusted under 35 U.S.C. 154(b) by 1095 days.

(21) Appl. No.: 12/084,488

(22) PCT Filed: Oct. 25, 2006

(86) PCT No.: PCT/EP2006/067754
§ 371 (c)(1),
(2), (4) Date: May 2, 2008

(87) PCT Pub. No.: WO2007/051746
PCT Pub. Date: May 10, 2007

(65) Prior Publication Data
US 2009/0312003 A1 Dec. 17, 2009

(30) Foreign Application Priority Data
Nov. 2, 2005 (DE) .......................... 10 2005 052 262

(51) Int. Cl.
*H04W 4/00* (2009.01)
(52) U.S. Cl. ............... 455/435.3; 455/422.1; 455/435.1; 455/435.2
(58) Field of Classification Search ............... 455/422.1, 455/435.1–435.3
See application file for complete search history.

(56) References Cited

U.S. PATENT DOCUMENTS

2003/0131151 A1* 7/2003 Roach et al. .................. 709/328
2004/0246965 A1 12/2004 Westman et al.
2005/0009520 A1* 1/2005 Herrero et al. ............. 455/435.1

FOREIGN PATENT DOCUMENTS

| EP | 1089515 | 4/2001 |
|---|---|---|
| EP | 1402705 | 1/2005 |
| WO | WO 03047162 | 6/2003 |
| WO | WO 03075596 | 9/2003 |
| WO | WO 2004071104 | 8/2004 |

OTHER PUBLICATIONS

Ericsson: "Clarification on terminology in 23.228: user and subscriber" 3GPP TSG-SA2 Meeting #25, CR 178, TDOC S2-022002, Jun. 24, 2002-Jun. 28, 2002, pp. 1-84, XP002419866 Finland; 2002.
International Search Report of International Application No. WO 2007/051746 (mailed Feb. 26, 2007).

* cited by examiner

*Primary Examiner* — Olumide T Ajibade Akonai
*Assistant Examiner* — Jaime Holliday
(74) *Attorney, Agent, or Firm* — Staas & Halsey LLP

(57) ABSTRACT

A serving call session control function unit (S-CSCF) is provided within an IMS-based service communication system in order to register a user of a mobile communication terminal for communication service in a mobile communication system. The IMS-based service communication system has several call session control function units and at least one interrogation call session control function unit (I-CSCF). The mobile communication system is equipped with at least one policy decision point unit (PDP). To select a suitable S-CSCF unit, user information is first determined using a user context server unit that is assigned to the policy decision point unit and network information is determined using a network context server unit. The user information and network information are interlinked in the policy decision point unit (PDP) and user-specific and/or network-specific selection criteria are derived from said information and are taken into consideration to select a suitable S-CSCF unit.

21 Claims, 2 Drawing Sheets

METHOD FOR SELECTING AN S-CSCF UNIT WITHIN AN IMS-BASED SERVICE COMMUNICATION SYSTEM

CROSS-REFERENCE TO RELATED APPLICATIONS

This application is based on and hereby claims priority to PCT Application No. PCT/EP2006/067754 filed on Oct. 25, 2006, and German Application DE 10 2005 052 262.9 filed on Nov. 2, 2005, the contents of which are hereby incorporated by reference.

BACKGROUND OF THE INVENTION

1. Field of the Invention

The inventors have studied a method for selecting a serving call session control function unit within an "Internet Protocol Multimedia Subsystem" based service communication system in order to register a user of a mobile communication terminal for at least one communication service within a mobile communication system, wherein the IMS-based service communication system has several serving call session control function units and at least one interrogation call session control function unit and the mobile communication system has at least one policy decision point unit.

2. Description of the Related Art

In existing second generation mobile communications systems, communication services such as, for example, GPRS ("General Packet Radio Services") are already available where data is transmitted as data packets. This enables better utilization of the transmission resources available in the associated mobile communications systems or mobile communication systems.

In order to extend the existing GPRS architecture and to provide additional multimedia communication services, in particular for third generation mobile communication systems, for example, communication systems designed according to UMTS ("Universal Mobile Telecommunication System") transmission technology, there are optimized special communication systems or service communication systems, such as, for example, the "Internet Protocol Multimedia Subsystem" (IMS) communication system.

The service users are connected to the IMS-based service communication system via an access communication system, for example a GPRS access communication system and then the IMS-based service communication system provides data or multimedia services via the existing connection. Here one could mention voice services, data services, audio services, video services, information services and program communication services as examples of communication or multimedia services.

Within such an IMS-based service communication system there is a "Session Initiation Protocol" (SIP) signaling protocol for setting up communication links. The communication subscribers are identified within the IMS-based service communication system using long-term stable identifiers, so-called "SIP Uniform Resource Identifier" (SIP URI), the construction of which is similar to that of a standard e-mail address.

In order to implement the SIP signaling protocol, there are special service control units that provide the link and service control functions, the so-called "Call State Control Function" (CSCF). An IMS-based service communication system of this kind comprises, for example, a "Serving Call Session Control Function" (S-CSCF) unit, an "Interrogation Call Session Control Function" (I-CSCF) unit and a "Proxy Call Session Control Function" (P-CSCF) unit, which take on different signaling and control tasks.

The selection of the S-CSCF unit to be provided to create a communication service is currently made in accordance with the selection procedure described in the Standard 3GPP TS 23.228. To this end, until now the I-CSCF unit has generated a Cx query message or Cx select pull message and transmitted said message to the main mobile switching centre ("Home Subscriber Server"). The said messages contain at least the identifier of the S-CSCF unit, provided this is already known to the main switching centre. Further data, for example relating to the resources ("capabilities") of the S-CSCF unit can also be transmitted in addition to the identifier of the S-CSCF unit, if this is necessary for setting up the desired communication service. The I-CSCF unit carries out a new registration based on the data transmitted. If the identifier of the S-CSCF unit is missing, then the I-CSCF unit selects an S-CSCF unit just on the basis of the resources transmitted.

SUMMARY OF THE INVENTION

In one aspect, a method is provided for dynamically selecting an S-CSCF unit within an IMS-based service communication system, wherein the evaluation of additional selection criteria enables selection to be improved. In one aspect of the proposed method, user information is determined via a user context server unit that is assigned to the policy decision point unit and network information via a network context server unit. The user and network information are interlinked in the policy decision point unit and user and/or network-specific selection criteria are derived from said information. Taking into consideration the user and/or network-specific selection criteria, a suitable S-CSCF unit is then selected.

In one aspect, the proposed method modifies the selection procedure for determining an S-CSCF unit described in 3GPP TS 23.228 to the effect that additional information, in particular user and network-related information is also taken into consideration when selecting the S-CSCF unit. The said additional information is used as selection criteria when evaluating the resources of the different S-CSCF units. Thus, for example user profiles, user tariff information and network node characteristics can also be taken into consideration in the selection as well as the current utilization of the communication systems or of the access network nodes and possibly also a user's location information.

The above-described embodiments of the present invention are intended as examples, and all embodiments of the present invention are not limited to including the features described above.

BRIEF DESCRIPTION OF THE DRAWINGS

In the following, the proposed method is explained in greater detail using an embodiment and its associated figures, in which.

DETAILED DESCRIPTION OF THE PREFERRED EMBODIMENTS

Figure 1:
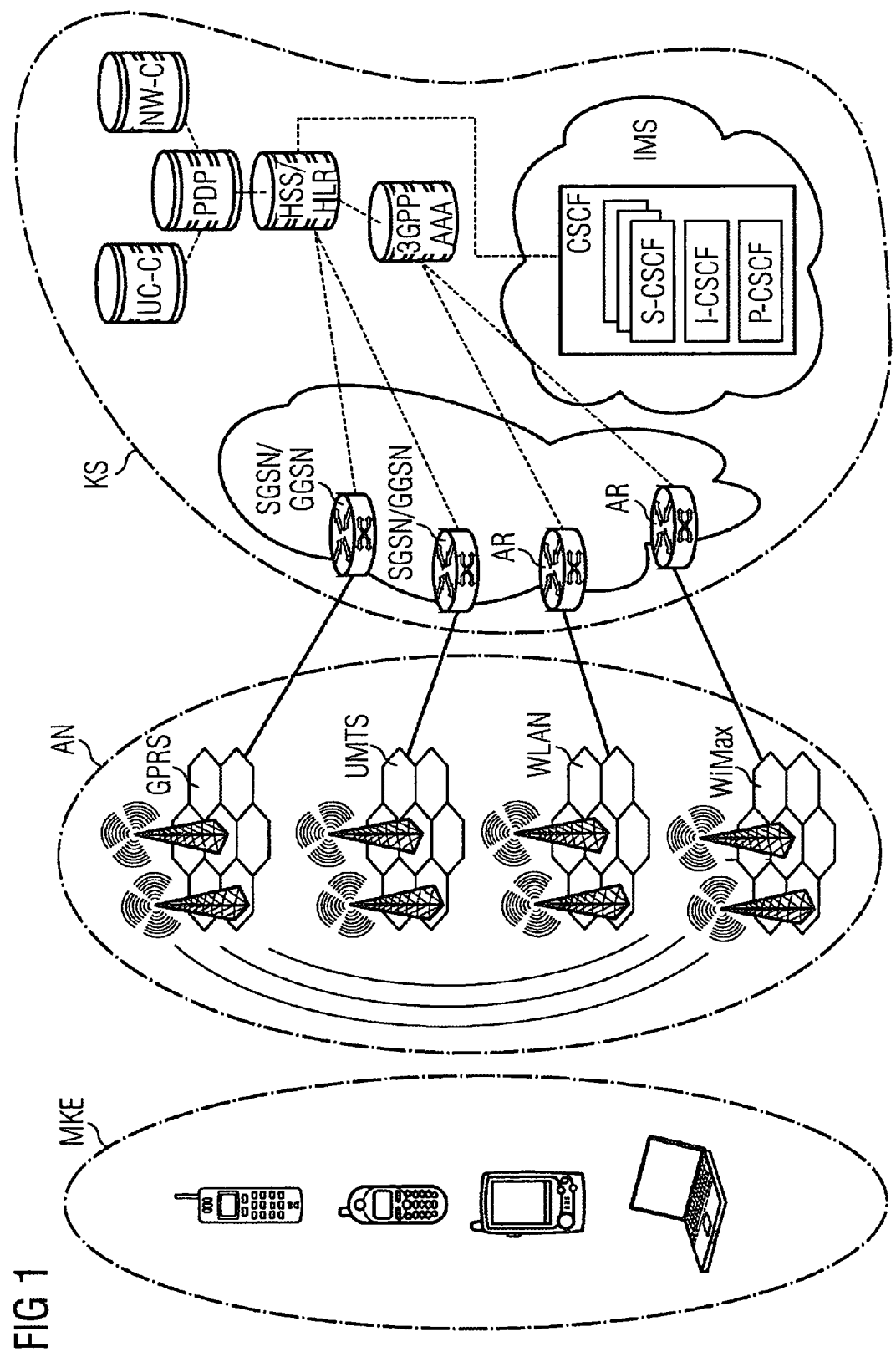
FIG. 1 shows, by way of example, a mobile communication system with an IMS-based service communication system in a schematic block diagram

Reference may now be made in detail to embodiments of the present invention, examples of which are illustrated in the accompanying drawings, wherein like reference numerals refer to like elements throughout.

The schematic block diagram represented in FIG. 1 shows, by way of example, the network architecture of a mobile communication system KS, which is connected via several access networks ("Access Networks") AN to at least one mobile communication terminal MKE.

The access networks AN can support different access technologies, for example "General Packet Radio Service", "Universal Mobile Telecommunication System", "Wireless Local Area Network", "Worldwide Interoperability for Microwave Access" or "Enhanced Data Rates for GSM Evolution".

In the present exemplary embodiment, there are, for example, a first access network GPRS supporting the "General Packet Radio Service" access technology, a second access network UMTS supporting the "Universal Mobile Telecommunication System" access technology, a third access network WLAN supporting the "Wireless Local Area Network" access technology and a fourth access network WiMax supporting the "Worldwide Interoperability for Microwave Access", which are connected respectively via at least one dedicated access network node unit SGSN, GGSN, AR to the mobile communication system KS.

In the case of the first and second access networks GPRS, UMTS, the access network node units SGSN, GGSN are designed for example as "Serving GPRS Support Node" access network node SGSN and/or as "Gateway GPRS Support Node" access network node GGSN.

The "Serving GPRS Support Node" access network node SGSN is essentially responsible for managing the packet oriented communication services in accordance with the GPRS access technology, i.e. so-called "data sessions", i.e. packet oriented communication services are functionally set up, maintained and withdrawn again. Each SGSN access network node SGSN is allocated a coverage area.

As the gateway unit in the GPRS/UMTS based communication network, the "Gateway GPRS Support Node" access network node GGSN has the task of coordinating the data traffic between external packet data networks ("Packet Data Networks") and packet oriented switching networks ("Packet-Domain") of the mobile GPRS/UMTS-based communication network, wherein a gateway unit is provided to adapt different data transmission technologies to each other, in particular different data transmission rates.

The third access network WLAN supporting the "Wireless Local Area Network" access technology and the fourth access network WiMax supporting the "Worldwide Interoperability for Microwave Access" are, for example, connected to the mobile communication system KS via access router units AR.

In the present exemplary embodiment, the mobile communication terminals MKE are designed as mobile computer units, mobile telephones from a wide range of generations or personal digital assistants.

The access network node units SGSN, GGSN, AR are connected via signaling links, indicated by a broken line in FIG. 1, to a subscriber database unit ("Home Subscriber Server") HSS, to which a central subscriber database ("Home Location Register") HLR is assigned.

In order to make the WLAN/WIMAX access technology available there is, in addition, an "Authentication, Authorization and Accounting" control unit AAA in accordance with the 3GPP Standard, which communicates with the third and fourth access network WLAN, WIMAX via access router units AR, and is connected to the main mobile switching unit HSS via a further signaling link.

The subscriber database unit HSS is connected to a policy decision point unit PDP, which is connected with a user context server unit UC-S and also a network context server unit NW-C in order, inter alia to determine user specific and network specific information. For example, the policy decision point unit PDP is used to control the access and/or overload control when communication services are being set up within the mobile communication system KS.

In addition to the subscriber database unit HSS, the mobile communication system KS has a service communication system IMS, which has a control unit CSCF. For the different signaling and control tasks there are several "Serving Call Session Control Function" unit S-CSCF, at least one "Interrogation Call Session Control Function" unit I-CSCF and one "Proxy Call Session Control Function" unit P-CSCF provided within the control unit CSCF, which are in communication with each other. In addition, at least the "Interrogation Call Session Control Function" unit I-CSCF is connected to the main mobile switching unit HSS via a signaling link.

The service communication system IMS is designed as an "Internet Protocol Multimedia Subsystem" service communication system IMS, which enables the provision of communication or multimedia services within the mobile communication system KS. Here one could mention voice services, data services, audio services, video services, information services and program communication services as examples of communication or multimedia services.

In order to set up such communication services, the IMS-based service communication system IMS provides a "Session Initiation Protocol" signaling protocol. The user of a mobile communication terminal MKE is identified within the IMS-based service communication system IMS using long-term stable identifiers, so-called "SIP Uniform Resource Identifier" (SIP URI), the structure of which is similar to that of a standard e-mail address. In order to register a user for a selected communication service, a standardized SIP register message is generated by the mobile communication terminal MKE and transmitted to the control unit CSCF or the "Proxy Call Session Control Function" unit P-CSCF.

Figure 2:
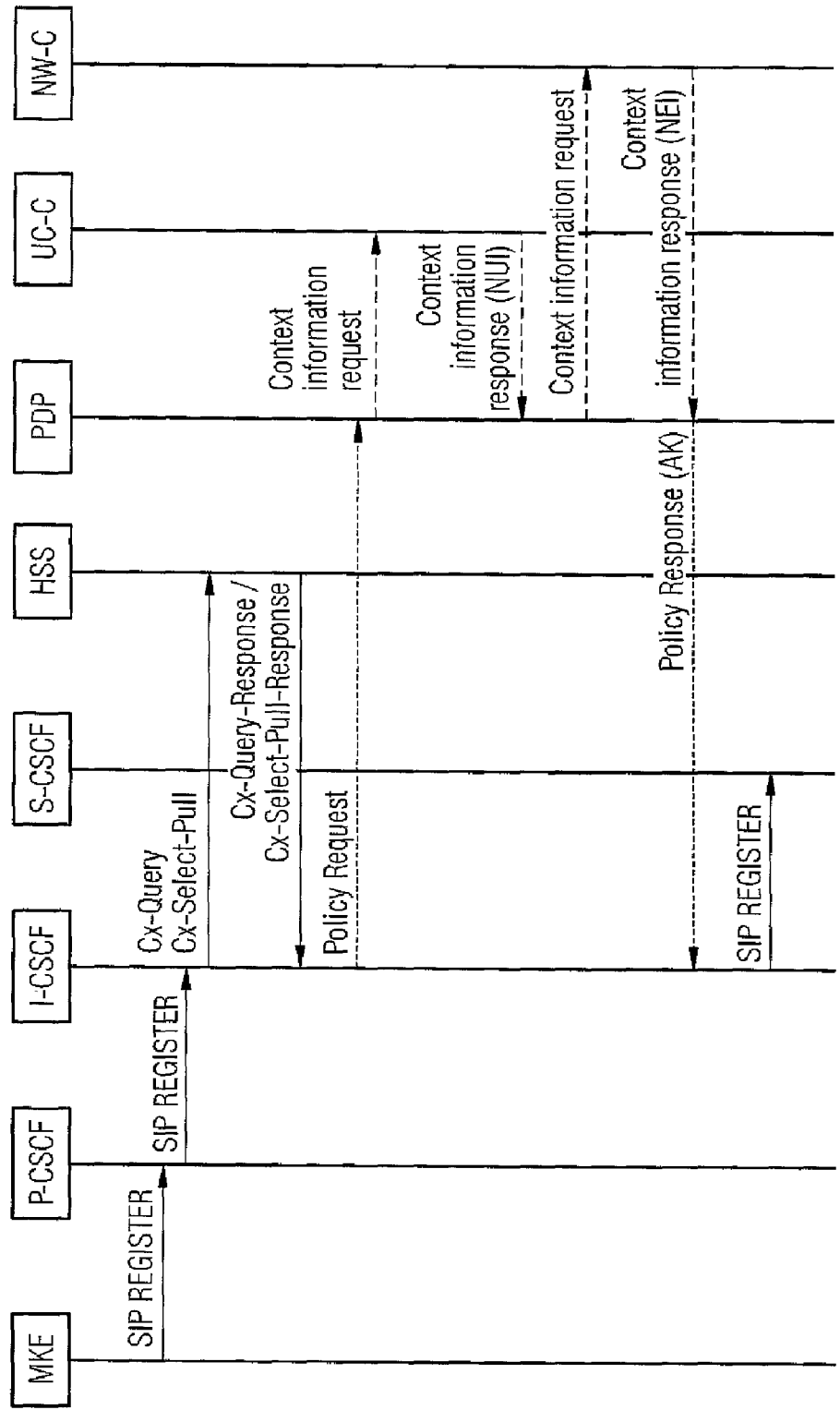
FIG. 2 shows, by way of example, the signaling operations additionally provided as part of a selection of an S-CSCF unit.

According to the proposed method, the standardized method for selecting an S-CSCF unit S-CSCF is extended by further selection criteria, In FIG. 2, by way of example, a flow diagram is shown to illustrate the signaling operations carried out in the selection procedure.

The registration of a communication service is initiated by a SIP register message being generated by the mobile communication terminal MKE, which transmits the SIP register message via the P-CSCF unit P-CSCF to the I-CSCF unit I-CSCF.

In accordance with Standard 3GPP TS 23.228, a Cx query/Cx select pull message is then formed in the I-CSCF unit and transmitted to the subscriber database unit HSS.

If a S-CSCF unit S-CSCF is already assigned for the chosen communication service in the subscriber database unit HSS and its identifier is known, then this identifier is transmitted by the subscriber database unit HSS via the Cx query/Cx select pull response message to the I-CSCF unit I-CSCF. Further data, for example relating to the resources ("capabilities") of the S-CSCF unit can also be transmitted in addition to the identifier of the S-CSCF unit, if this is necessary for setting up the desired communication service.

If, however, at the time of the request, no assignment of a S-CSCF unit S-CSCF has been made in the subscriber database unit HSS, then based on the data indicating the resources ("capabilities") of the S-CSCF unit to be selected, a policy request message may be generated in the I-CSCF unit and transmitted to the policy decision point unit PDP.

In a preferred embodiment, the network address of the policy decision point unit PDP is stored in the I-CSCF unit I-CSCF or is stored in the subscriber database unit HSS or the central subscriber database HLR and is transmitted to the I-CSCF unit I-CSCF via the Cx query/Cx select pull response message by the subscriber database unit HSS.

The policy decision point unit PDP is preferably provided as a policy server unit in the "Home Public Land Mobile Network" communication system (H-PLMN), which unit determines the selection criteria AK to be used in the selection of the S-CSCF unit S-CSCF. To determine the selection criteria AK, the policy decision point unit PDP uses a context information request message to start a request to the user context server unit UC-C and the network context server unit NW-C for the user initiating the registration.

Using the user context server unit UC-S, the user information NUI stored for the user of the mobile communication terminal MKE is retrieved. User information NUI can be, for example, the information relating to the user tariff conditions, the communication profile given by the user or a desired minimum transmission quality. In addition, there can be information relating to the current whereabouts of the user.

The network context server unit MW-C is designed to determine network information NEI relating to the network components of the mobile communication system KS made use of by the user or to the technical features ("capabilities") of the mobile communication terminal MKE used by the user. Said information can relate for example to the current load distribution of the entire mobile communication system KS or of individual network components as well as the send/playback characteristics and/or send/playback capacities of the mobile communication terminal MKE of the user.

The user information NUI and network information NEI determined via the user context server unit UC-S and the network context server unit NW-C are respectively transmitted via a context information response message to the policy decision point unit PDP.

Subsequently, in the policy decision point unit PDP, the determined user information and the network information NUI, NEI are interlinked and user and/or network-specific selection criteria AK ("Policies") are derived from said information, and said criteria is subsequently transmitted to the I-CSCF unit I-CSCF by the policy decision point unit PDP by a policy response message.

Based on the user and/or network-specific selection criteria AK received, the network address of a suitable S-CSCF unit S-CSCF is determined by the I-CSCF unit I-CSCF. Alternatively, the network address of a suitable S-CSCF unit S-CSCF can already be determined in the policy decision point unit PDP while evaluating the user and/or network specific selection criteria AK.

Subsequent to that the I-CSCF unit continues the selection procedure preset in Standard 3GPP TS 23.228, and the I-CSCF unit I-CSCF generates a SIP REGISTER message and transmits it to the network address of the selected S-CSCF unit S-CSCF, the selected S-CSCF unit answers or further processes said message in the manner described in Standard 3GPP TS 23.228.

The invention has been described in detail with particular reference to preferred embodiments thereof and examples, but it will be understood that variations and modifications can be effected within the spirit and scope of the invention covered by the claims which may include the phrase "at least one of A, B and C" as an alternative expression that means one or more of A, B and C may be used, contrary to the holding in Superguide v. DIRECTV, 69 USPQ2d 1865 (Fed. Cir. 2004).

The invention claimed is:

1. A method for selecting a serving call session control function unit within a service communication system based on the "Internet Protocol Multimedia Subsystem" in order to register a user of a mobile communication terminal for at least one communication service within the mobile communication system, comprising:
   providing a plurality of serving call session control function units for the IMS-based service communication system;
   providing at least one interrogation call session control function unit for the IMS-based service communication system;
   providing at least one policy decision point unit for the mobile communication system;
   assigning a user context server unit to a policy decision point unit;
   determining user information using the user context server unit;
   determining network information using a network context server unit;
   interlinking the user information and the network information in the policy decision point unit;
   deriving, by the policy decision point unit, user-specific or network-specific selection criteria from said user and network information taking the user and network information into consideration; and
   selecting a suitable S-CSCF unit by considering the derived user-specific or network-specific selection criteria.

2. The method as claimed in claim 1, further comprising selecting the suitable S-CSCF unit in the I-CSCF unit or the policy decision point unit taking into consideration the user or network specific selection criteria.

3. The method as claimed in claim 1, further comprising determining the network address of the suitable S-CSCF unit during the selection process.

4. The method as claimed in claim 1, further comprising determining the tariff data relating to the user of the mobile communication terminal, user profiles given by the user, transmission quality specifications or user location information as user information using the user context server unit.

5. The method as claimed in claim 1, further comprising determining the current load distribution within the mobile communication system, the network architecture or the technical features of the mobile communication terminal used by the user as network information using the network context server unit.

6. The method as claimed in claim 1, further comprising using a context information request message to start a request respectively to the user context server unit (UC-C) and the network context server unit in order to determine the user and network specific selection criteria.

7. The method as claimed in claim 1, further comprising transmitting the user information determined using the user context server unit and the network information determined using the network context server unit respectively via a context information response message to the policy decision point unit.

8. The method as claimed in claim 1, further comprising requesting the user or network specific selection criteria from the policy decision point unit by the I-CSCF unit by a policy request message.

9. The method as claimed in claim 1, further comprising transmitting the user or network specific selection criteria from the policy decision point unit to the I-CSCF unit by a policy response message.

10. The method as claimed in claim 1, further comprising designing the policy decision point unit as a policy server unit in the "Home Public Land Mobile Network" communication system (H-PLMN).

11. The method as claimed in claim 1, further comprising:
saving the network address of the policy decision point unit in the I-CSCF unit or in a subscriber database unit (HSS); and
transmitting the network address via a Cx query/Cx select pull response message from the subscriber database unit (HSS) to the I-CSCF unit.

12. The method as claimed in claim 2, further comprising determining the network address of the suitable S-CSCF unit during the selection process.

13. The method as claimed in claim 12, further comprising determining the tariff data relating to the user of the mobile communication terminal, user profiles given by the user, transmission quality specifications or user location information as user information using the user context server unit.

14. The method as claimed in claim 13, further comprising determining the current load distribution within the mobile communication system, the network architecture or the technical features of the mobile communication terminal used by the user as network information using the network context server unit.

15. The method as claimed in claim 14, further comprising using a context information request message to start a request respectively to the user context server unit (UC-C) and the network context server unit in order to determine the user and network specific selection criteria.

16. The method as claimed in claim 15, further comprising transmitting the user information determined using the user context server unit and the network information determined using the network context server unit respectively via a context information response message to the policy decision point unit.

17. The method as claimed in claim 16, further comprising requesting the user or network specific selection criteria from the policy decision point unit by the I-CSCF unit by a policy request message.

18. The method as claimed in claim 17, further comprising transmitting the user or network specific selection criteria from the policy decision point unit to the I-CSCF unit by a policy response message.

19. The method as claimed in claim 18, further comprising designing the policy decision point unit as a policy server unit in the "Home Public Land Mobile Network" communication system (H-PLMN).

20. The method as claimed in claim 19, further comprising:
saving the network address of the policy decision point unit in the I-CSCF unit or in a subscriber database unit (HSS); and
transmitting the network address via a Cx query/Cx select pull response message from the subscriber database unit (HSS) to the I-CSCF unit.

21. A policy decision point unit (PDP) in a mobile communication system (KS), wherein a serving call session control function unit (S-CSCF) is selected within a service communication system (IMS) based on the "Internet Protocol Multimedia Subsystem" in order to register a user of a mobile communication terminal (MKE) for at least one communication service within the mobile communication system (KS), wherein the IMS-based service communication system (IMS) has several serving call session control function units (S-CSCF) and at least one interrogation call session control function unit (I-CSCF),
and wherein
a user context server unit (UC-C) is assigned to the policy decision point unit (PDP) for determining user information and a network context server unit (NW-C) is connected to the policy decision point for determining network information,
user information and network information are interlinked in the policy decision point unit (PDP) and user-specific and/or network-specific selection criteria (AK) are derived from said information and are taken into consideration to select a suitable S-CSCF unit (S-CSCF), and
a suitable S-CSCF unit is selected by considering the derived user-specific or network-specific selection criteria.

* * * * *

UNITED STATES PATENT AND TRADEMARK OFFICE
CERTIFICATE OF CORRECTION

PATENT NO. : 8,374,605 B2  
APPLICATION NO. : 12/084488  
DATED : February 12, 2013  
INVENTOR(S) : Gerhard Kuhn et al.

Page 1 of 1

It is certified that error appears in the above-identified patent and that said Letters Patent is hereby corrected as shown below:

Title Page, Item (73) (Assignee); Line 1, Delete "Seimens" and insert -- Siemens --, therefor.

Signed and Sealed this  
Fourteenth Day of May, 2013

Teresa Stanek Rea  
*Acting Director of the United States Patent and Trademark Office*